United States Patent Office 3,011,216
Patented Dec. 5, 1961

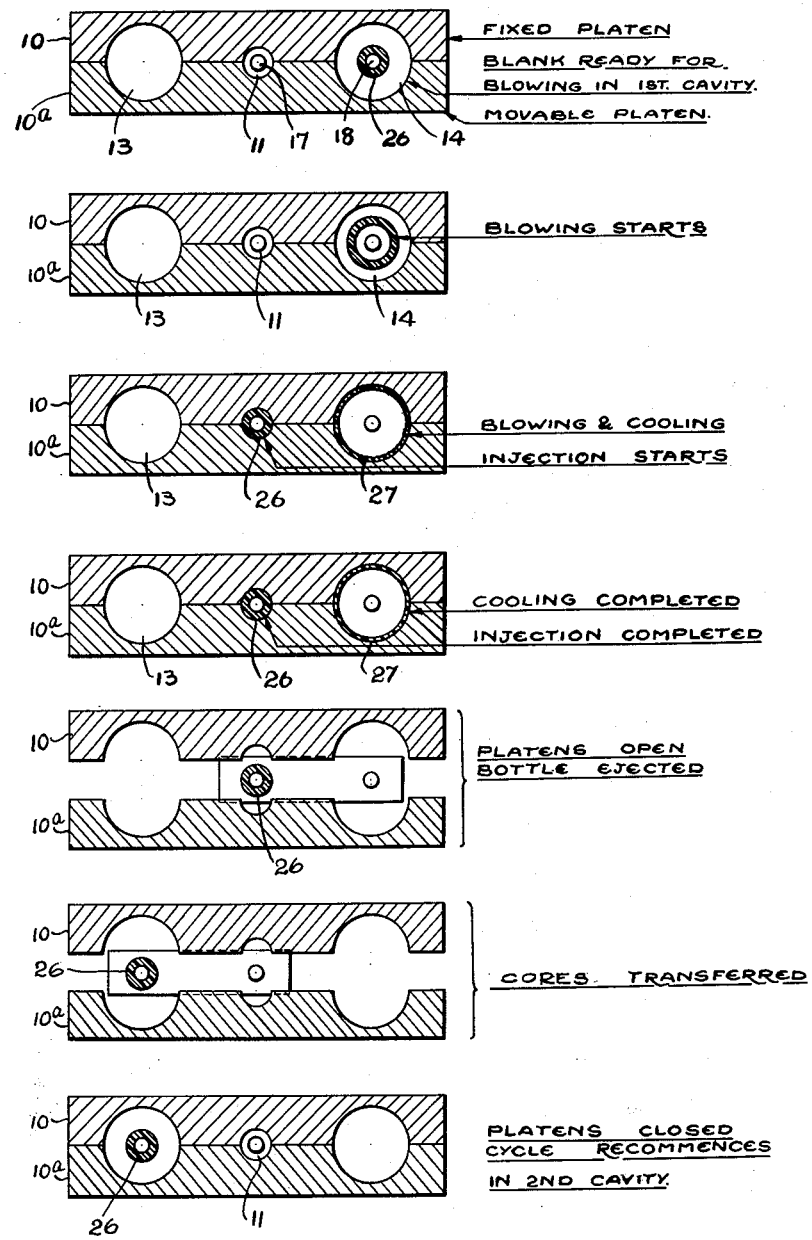

3,011,216
METHOD FOR PRODUCING HOLLOW BLOWN ARTICLES FROM THERMOPLASTIC MATERIALS
Angelo Gussoni, Milan, Italy, assignor to Samuel Dubiner
Filed Jan. 11, 1957, Ser. No. 633,769
1 Claim. (Cl. 18—55)

This invention relates to a method for forming hollow articles from thermoplastic materials such as polythene and in particular to the forming of such articles by an injection molding. By the term thermoplastic material wherever used in the following specification is meant polymers and copolymers of organic materials.

This application is a continuation-in-part of my co-pending application Serial Number 381,914 filed September 23, 1953, and now abandoned.

There are two known methods of forming hollow articles from thermoplastic materials one of which is by extruding a tube of thermoplastic materials and while it is in an expandible state, expanding the tube, by gas pressure, in a blow mold having the shape of the finished article; and the other by injecting the material onto a core in an injection mold carried by the platens of an injection molding machine and transferring the core and the material to a blow mold having the shape of the finished article, also carried by the platens, where it is expanded by gas pressure to the shape of the finished article.

One method already proposed carries out the injection and blowing in sequence, that is, the material is injected into the injection mold and formed as a slug on a transferable core then, when the injection is completed the slug and core are transferred to the blow mold. Such a method is disclosed in Swiss Patent Number 281,216 of June 3, 1952. One of the disadvantages of this method is that it is too slow for mass production and therefore not economic from a commercial aspect. It will be obvious that the platens on which the molds are mounted have to be opened twice to obtain a completed article.

It has also been proposed to employ a pair of cores co-ordinated to two blow molds between which one injection mold is arranged, and to provide for the reciprocating shifting of the cores between the molds in such a manner that in a first cycle of operation one core is within the injection mold that receives by injection a fresh slug of material, the other core, which has previously had formed thereon a slug of material, is expanded, then the molds are opened, the formed article is ejected and the cores are shifted so that the core having the newly formed slug is now within the other blow mold and the core from which the article has been released is shifted to the injection mold and after the molds have been closed, a fresh slug is formed on the core located therein while the slug on the other core is being expanded, and so forth. Such an apparatus is disclosed in United States Patent Number 2,298,716 dated October 13, 1942. However, owing to the nature of the thermoplastic material, the methods and apparatus heretofore in use have certain drawbacks. Thermoplastic materials, such as polythene, tend to set-up very quickly and to shrink unless the material, from the time it is first introduced into the injection mold until it is expanded in the blow mold, is handled expeditiously.

In the methods and apparatus heretofore in use the article formed in the blow mold has to be kept in the latter not only during the time needed for the expansion of the slug into the desired shape, but for some time thereafter until it has solidified by cooling so that it will not deform when discharged therefrom. The total time for the preceding operation is more than is required for the formation of the slug in the injection mold. The material in the injection mold therefore commences to cool which has several undesirable results, two of which are shrinkage and setting-up. In order to prevent this, special heating means have been proposed in order to keep the material in the appropriate plastic condition. But since the material is a poor conductor of heat such auxiliary heating means have not proved satisfactory. Furthermore, such known apparatus of the kind referred to are slow in the performance of the several steps connected with the opening of the molds, transfer of the cores and closing of the molds.

The invention, therefore, has the object so to improve the process for the production of hollow blown articles on an injection molding machine whereby the setting-up of the material in the injection mold is avoided.

Accordingly, the invention consists in a process for the manufacture of hollow articles, especially bottles, by the concurrent formation and expansion, respectively, of slugs of heat-plasticized thermoplastic material on at least two cores so co-ordinated to a set of injection and blow molds that in the period between each concurrent slug-forming and blowing cycle the article produced is ejected and the cores are transferred from mold to mold for a fresh cycle of concurrent slug formation and slug expansion, which process is characterized in that in each cycle of operation the injection of heat plasticized thermoplastic material by the injection device, is made to lag behind the beginning of the expansion in the blow mold of the previously formed slug transferred thereto, by a time lag whereby the injection of the material on the core in the injection mold is completed substantially simultaneously with the completion of the blowing and cooling of the article in the blow mold.

The method of the present invention is remarkable for its simplicity enables a great speed operation, so much so that the fresh slugs can be kept sufficiently plastic until the end of the blowing operation without requiring extraneous heating in the mold.

The invention is illustrated, by way of example only, in the accompanying drawings in which:

FIGURE 3 is a diagram of the sequence of operation of the apparatus according to the invention.

Figure 1:
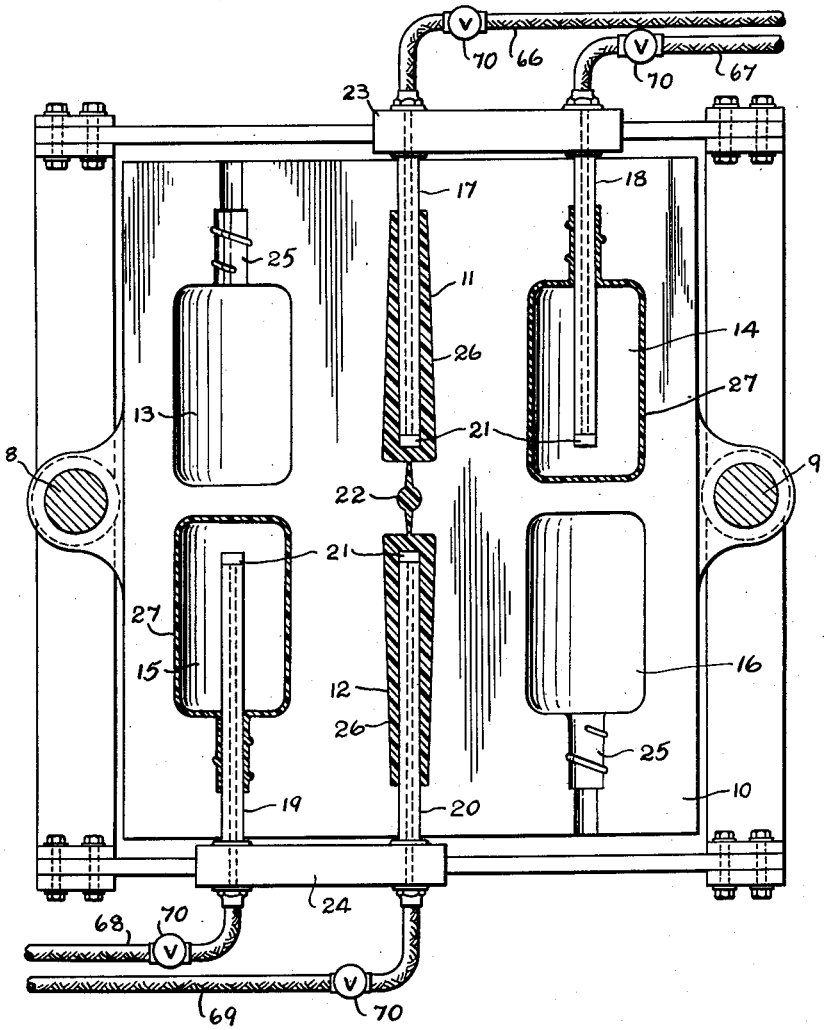
FIGURE 1 is a part-sectional elevation of one platen of a bottle manufacturing apparatus according to the invention.
Figure 2:
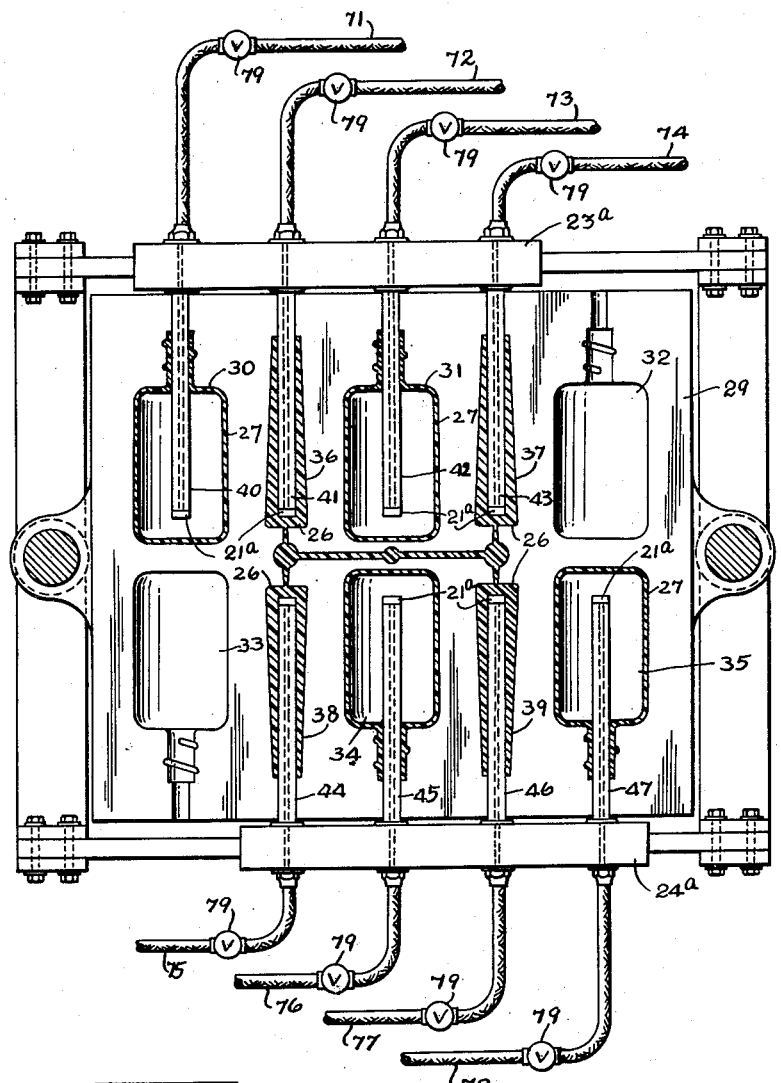
FIGURE 2 is an alternative construction to that shown in FIGURE 1.

In the embodiment of the invention according to FIGURES 1 and 2, the tie bars 8, 9 of an injection molding machine of conventional design carry a fixed platen 10 and a movable platen 10a, each platen forming one-half of two sets of molds disposed in bottom-to-bottom relation. Each of these sets includes an injection mold 11, 12 respectively, flanked by two blow molds 13, 14 and 15, 16 respectively. A pair of cores 17, 18 is associated with the upper set of molds and a pair of cores 19, 20 with the lower set. A sprue bushing 22 is disposed midway between the bottoms of the injection molds 11, 12 and connected to both through short gates.

Each core is formed with a hollow passage communicating with the interior of the slug formed in the cores through which gas pressure is admitted to expand the slug in the blow mold. The end of each core is fitted with a non-return valve 21, which prevents thermoplastic material flowing into the passage. The core extends the full length of the slug to be formed, with the lower end of the slug almost reaching the bottom of the blow mold but leaving sufficient space between the lower end of the slug and the bottom of the blow mold to control the thickness of the bottom wall of the blown article. The slug is slightly shorter than the length of the blow mold to allow for expansion of the bottom of the slug.

The cores 17, 18 are diagrammatically illustrated as mounted on an upper carriage 23, and the cores 19, 20 are mounted on a lower carriage 24. The carriages 23, 24 are, through appropriate mechanism, actuated so that when the molds open, the cores are moved out of the molds to a position centrally between the platens, in which position the finished article is ejected, and then the carriages are reciprocated laterally, between the platens, to bring the empty core into alignment with the injection mold and the core, on which the slug has been formed during the blowing of the article which has just been ejected, is brought into alignment with a blow mold. The platens are then closed which closes the molds around the cores.

It is preferred that the shifting movements of the two pairs of cores be effected in opposite directions, as illustrated in FIGURES 1 and 2. This produces an automatic separation of the sprue from the slug and makes superflous the elaborate devices provided for this purpose in some known apparatus.

The cores 17, 18 and 19, 20 are connected to a supply of gas pressure through conduits 66, 67 and 68, 69, respectively. The gas pressure required is that which will fully expand the slug and allow it to cool within the time allowed for expansion and cooling. Each conduit is provided with a valve 70 which is controlled to open and shut the gas supply to the cores. When the platens are opened, the blown article is ejected by gas pressure. Gas pressure is not admitted to the cores when they are being loaded in the injection mold. However, if it is necessary to cool the core in the injection mold gas pressure may be admitted to the core prior to the commencement of the injection of the thermoplastic material into the injection mold.

A very smooth operation is obtained by lubricating the core and this may be accomplished by placing an air line lubricator in the gas pressure line by means of which a lubricant, such as metal stearate or silicon, is automatically made to coat the outside and inside, including the valve mechanism, of the core.

The production of articles by the machine described herebefore, as generally the manufacture of hollow bodies from thermoplastic materials by injection followed by blowing, requires the careful control of a number of co-operating factors, especially the following: (*a*) the initial heat of the thermoplastic material in the injection chamber of the injection molding machine; (*b*) the length of the time the injection plunger takes to fill the injection mold; (*c*) the length of the dwell period of the injection plunger to obtain the proper density of the injected slug; (*d*) the length of time that the plunger takes to withdraw; (*e*) the time that it takes to transfer the formed slug from the injection mold to the blow mold; (*f*) the length of time it takes to expand, cool and eject the blown article; (*g*) the length of time the air is passed through the cores; (*h*) the temperature of the platens; (*i*) the time that the platens remain open between cycles.

In order to properly carry out the process according to the invention, the material in the injection cylinder should be raised to the proper temperature so that when injected it retains the proper elasticity required for blowing. This temperature will vary as the index of elasticity for different material varies. Polythene, an especially suitable material, has an index of elasticity of $0.19 \times 10^5$ p.s.i.

The front (fixed) platen is cooled to approximately 150° F., and the back platen to 90° F., except for the injection molds which are allowed to rise to 150° F.

*Example*

To produce a 4 oz. bottle having a weight of 39 lbs. per 1000 (thousand) bottles from polythene the following cycle gives satisfactory results:

INJECTION: The platens having closed to initiate the cycle of concurrently injecting and blowing and cooling, the injection plunger of the machine, after the requisite time lag, moves in to inject a slug of material onto the core. Injection time 5 seconds. The injection cycle including the dwell period, is retarded so that it will be completed co-incident with the blowing cycle which is carried on concurrently therewith. Thus the injection, in the present illustration, commences 8 seconds after the blowing cycle has started.

DWELL: (1) Plunger full volume—20,000 lbs. p.s.i. to obtain correct slug density, time 3 seconds.
(2) Plunger withdrawn, time—1 second.

BLOW: When the platens are closed, a switch is tripped admitting gas pressure to the slug through the core, in the blow mould—(the blowing includes a dwell period) time—17 seconds. Gas pressure is then shut-off.

TRANSFER: At the end of the preceding cycles plunger trips limited switch; platens open, thereby opening the moulds, slug and core transferred to blowing mould, platens close—time 2½ seconds.

EJECT: Platens open-trip opening switch, the carriages move the cores and bottles move to a position between the platens—bottles blown off by a blast of air admitted through the cores—the cores then move to final position in the injection mould—the time 1⅛ seconds. Platens close for new cycle of injection and blowing—time 1¼ seconds.

Thus the total time required for producing one bottle is 30⅞ seconds, but in fact, a bottle is delivered from either set of blow molds in the time required for the blowing cycle, opening and closing the platens, e.g., approximately 19½ seconds.

The gas pressure which is used for expanding the slug is that which will fully expand the slug and allow it to cool in the time allowed for the blowing cycle. The platens are cooled as hereinafter described. If necessary to dissipate heat from the core, compressed air may be blown through the core while it is in the injection mold up to the time the material is injected onto the core, or a cool water channel can be run around the base of the core.

By maintaining the foregoing factors the following conditions which are necessary for satisfactory blowing a hollow article are maintained:

(1) The correct core temperature;
(2) The correct density of the formed slug;
(3) The correct heat and physical properties of the material;

The temperature of the core is very important and is dependent on the following factors:

(1) The heat of the injected material;
(2) The temperature of the front (stationary) platen;
(3) The time that the platens remain open between each cycle;
(4) The length of the time the air is passed through the core.

The temperature range of the core will be maintained between 176° F. with the best results obtained at about 182° F.

In order to perform these operations with the apparatus illustrated in the drawings one proceeds as follows:

The injection molding machine is timed to carry out the cycle of operations previously specified. The injection molds 11, 12 are shown with the formed slugs 26 of thermoplastic material attached thereto and with the cores 18 and 19 in the respective blow molds with slugs therein expanded to finished form therein at the completion of its blowing and cooling cycle which requires a minimum of approximately 17 seconds. The finished article is indicated by the numeral 27. The injection cycle is combined and co-ordinated with the blowing and cooling cycle so that both cycles end simultaneously.

For this purpose, in accordance with the invention the initiation of the injection of the thermoplastic material into the injection mold is retarded until the blowing has continued for 8 seconds to partially expand and cool a slug in the blow mold. The injection plunger begins to move in to inject the thermoplastic material into the injection mold 11, 12 which injected material produces a formed slug on cores 17, 20. When the injection cycle has been completed, the machine is timed to shut off the gas pressure to the blow molds and the molds are opened by the movable platen moving away from the front platen. As the platens open, the carriage 23 moves the core 17 with the attached formed slug and the core 18 out of their respective molds to a position centrally between the platens. When the finished bottle is free of the blow mould 14, the gas pressure valve is opened to direct a short blast of gas into the finished article to eject it from the core. The carriage is then shifted laterally of the platens to bring the core 17 with the newly injected slug attached into line with the blow mold 13, and the new empty core 18 into the injection mold. At the same time, the carriage 24 moves to a position centrally between the platens and is then shifted in the opposite direction to move the core 20 with the formed slug attached thereto into the empty blow mold 16, and the core 19, first ejecting the finished article as previously described, into the empty injection mold 12. During this movement the sprue is removed from the gate and the formed slug as previously described. The platens then close and the timing mechanism automatically causes the machine to carry out the steps of injecting, blowing, transferring and ejecting in the manner described.

The cycle of operation repeats, each time moving a newly formed slug into an empty blow mold and a core into an injection mold to form a slug thereon with the blowing operation.

In FIGURE 1, the neck of the bottle is shown as being formed in the blow mold. Consequently, each blow mold is formed with a neck cavity 25 which is threaded to form the neck when the blowing mold closes. The slugs that are formed by injecting the thermoplastic material are identified by the numeral 26, and the article blown therefrom in the blow mold is identified by the numeral 27.

The apparatus illustrated in FIG. 2 is in principle similar to that described hereinbefore but it is designed to obtain two bottles from each set of molds by each cycle of operation. The front platen 29 carries one half of the upper set of blow molds 30, 31, 32 and of the lower set of blow molds 33, 34, 35. The blow molds of each set are uniformly spaced. Positioned centrally between each two blow molds of either set are injection molds 36, 37 and 38, 39, respectively. Associated with the upper set are four cores 40, 41, 42, 43, and with the lower set four cores 44, 45, 46 and 47. The cores 41 to 47 are constructed in the same manner as the cores of FIG. 1 and are each provided with a valve 21a. The upper cores are mounted on a carriage 23a and the lower cores on a carriage 24a. The carriages 23a and 24a move the cores alternately from the blowing position to the injecting position in the same manner as described in FIG. 1.

The cores 40 to 47 are connected to a supply of compressed gas, having sufficient pressure to expand the slugs, by conduits 71, 72, 73, 74, 75, 76, 77 and 78 respectively. The conduits are each provided with a valve 79 which controls the admission of gas under pressure to the blow molds at the correct intervals as previously described. This modification may be provided with the air line lubricator and the sprue extractor employed in the embodiment illustrated in FIG. 1.

The invention is, of course, not limited to the particular magnitudes of times and temperature indicated hereinbefore by way of example.

What I claim as new and desire to protect by Letters Patent of the United States is:

The method of producing hollow blown articles from thermoplastic synthetic materials in an injection molding apparatus having at least two separable blow molds, an injection mold positioned between the blow molds, and a pair of cores transferable to and from said molds, said method comprising injecting heat-plasticized thermoplastic synthetic material onto the core in the injection mold to form a slug thereon and concurrently therewith forming in the blow mold a finished article by blowing a slug formed in the preceding cycle of injecting and blowing operation; commencing the injection of the material into the injection mold after the commencement of the blowing operation and timing the injection to terminate substantially coincident with the completion of the blowing operation; opening the molds, ejecting the finished article and simultaneously transferring the core with the newly formed slug thereon to a blow mold and the core from which the finished article had been ejected, to the injection mold; and repeating the cycle of injecting, blowing, ejecting and transferring operations.

References Cited in the file of this patent

UNITED STATES PATENTS

| | | |
|---|---|---|
| 2,298,716 | Moreland et al. | Oct. 13, 1942 |
| 2,315,478 | Parkhurst | Mar. 30, 1943 |
| 2,331,702 | Kopitke | Oct. 12, 1943 |
| 2,353,825 | Hofmann | July 18, 1944 |
| 2,789,312 | Borer | Apr. 23, 1957 |

FOREIGN PATENTS

| | | |
|---|---|---|
| 686,291 | Great Britain | Jan. 21, 1953 |